(12) United States Patent
Kodimer (10) Patent No.: US 11,036,441 B1
(45) Date of Patent: Jun. 15, 2021

(54) SYSTEM AND METHOD FOR CREATION AND INVOCATION OF PREDEFINED PRINT SETTINGS VIA SPEECH INPUT

(71) Applicant: Toshiba TEC Kabushiki Kaisha, Shinagawa-ku (JP)

(72) Inventor: Marianne Kodimer, Huntington Beach, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/773,130

(22) Filed: Jan. 27, 2020

(51) Int. Cl.
*G06F 3/12* (2006.01)
*G06K 15/00* (2006.01)
*H04N 1/00* (2006.01)
*G06F 3/16* (2006.01)

(52) U.S. Cl.
CPC .......... *G06F 3/1204* (2013.01); *G06F 3/1205* (2013.01); *G06F 3/1253* (2013.01); *G06F 3/1257* (2013.01); *G06F 3/167* (2013.01); *G06K 15/002* (2013.01); *H04N 1/00403* (2013.01); *G06F 3/1288* (2013.01)

(58) Field of Classification Search
None
See application file for complete search history.

(56) References Cited

U.S. PATENT DOCUMENTS

| 6,975,993 | B1 * | 12/2005 | Keiller | G10L 15/26 704/275 |
| 2002/0099456 | A1 * | 7/2002 | McLean | H04L 12/282 700/83 |
| 2018/0373481 | A1 * | 12/2018 | Kobayashi | G06F 3/1285 |
| 2019/0294386 | A1 * | 9/2019 | Iwamoto | G06F 3/1204 |
| 2020/0175982 | A1 * | 6/2020 | Nakamura | G10L 15/22 |
| 2020/0177745 | A1 * | 6/2020 | Ishida | G10L 15/22 |
| 2020/0177747 | A1 * | 6/2020 | Yasuda | G06F 3/1285 |
| 2020/0249883 | A1 * | 8/2020 | Nakata | G06F 3/1239 |

FOREIGN PATENT DOCUMENTS

JP    2005173794 A  *  6/2005

OTHER PUBLICATIONS

JP-2005173794A English Translation, Hirolta, Abstract, par 0005-0007 (Year: 2005).*

* cited by examiner

*Primary Examiner* — Miya J Williams
(74) *Attorney, Agent, or Firm* — Ulmer & Berne LLP (57) ABSTRACT

A system and method for language-based multifunction peripheral control includes receiving a user selection of an electronic document via a user interface of wireless portable data device. User selected print settings are also received via the user interface for printing the selected electronic document. The selected electronic document is then printed in accordance with the user selected print settings. The user associates a verbal shortcut with their current print settings, and the verbal instruction and settings are stored associatively. When the user wishes to print again, they can select their document and issue verbal print instructions which include their verbal shortcut. Print settings associated with this verbal shortcut are retrieved from memory and the document is printed using the print settings.

12 Claims, 6 Drawing Sheets

SYSTEM AND METHOD FOR CREATION AND INVOCATION OF PREDEFINED PRINT SETTINGS VIA SPEECH INPUT

TECHNICAL FIELD

This application relates generally to voice assisted control of document processing device operation with a portable data device such as a smartphone or tablet computer. The application relates more particularly to creating and invoking preset print settings pre-associated with a user-selected, verbal shortcut.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Currently most MFP or other office devices are driven by a user interface such as a touch panel or button panel. When a user wishes to print a document or image, they select an electronic copy and call a print driver or other printer interface and set their desired image settings.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In an example embodiment disclosed herein currently most MFP or other office devices are driven by a user interface such as a touch panel or button panel. In an effort to be more user friendly, as well as better compliant with section 508 of the Rehabilitation Act and promote ease of use for people with (or without) disabilities, devices may offer voice assisted user interfaces. Successful implementation can be difficult and costly and may not be compatible with devices currently in the field. As will be detailed further below, the subject application includes example embodiments wherein a mobile data device, such as a smartphone, tablet computer notebook computer, smart watch or the like is used to communicate wirelessly with an office device such as MFP (via Bluetooth, NFC, Wi-Fi, etc.) to provide the user with a natural language user interface to accomplish device tasks. Wireless communication is established between the app and MFP either optically or via radio frequency, such as by use of Wi-Fi, Wi-Fi direct, Bluetooth, NFC, or the like.

Printing from a desktop computer may use invocation of a printer driver that allows a user to create a text shortcut associated with the group of settings configured. Then, when the user recalls that shortcut, the settings would be reset. This allows users to assign a self-generated text value to their preferred print settings. For example, a user can assign the text value "draft mode" to equal: duplex, N-up, black and white only, staple, collate, paper type, paper size, hole punching, etc. Settings may also identify a particular printer or printing location to which a print job is to be sent.

In example embodiments disclosed herein, a speech interface provides a user with capability to apply a verbal shortcut to associate with selected print settings. This is suitably accomplished with a mobile app that enables a user to print a document or image and associate a verbal shortcut to the configured settings so that the next time when in context, such as when a selected electronic document is opened, the user can verbalize the previously defined key phrase to invoke the associated app and print using the target settings.

In further example embodiments described herein, a user is provided with a mobile application or app, such as eBRIDGE Print and Capture from Toshiba TEC, with natural language capabilities. With the app, the user can configure printer settings verbally and then can associate a verbal shortcut to the current settings so that when recalled, a print job will be printed based on the settings. Once the printer settings are set, the user associates the current settings with a verbal shortcut.

The print app is suitably associated with a document type so that when the user opens the associated document type, the print app can be opened automatically when viewing the document (as in the iOS "Open In" command). A verbal command is used to pair a currently opened document with the target app. For example, if the user has an image opened, they can say "Ebridge Print" to verbally invoke the "Open In" command using a Sin shortcut as an example.

A second part of the verbal command forms a command sequence to associate a verbal shortcut that is associated with the print settings in the app itself. To recall the target settings, the associated verbal shortcut is spoken. The verbal key phrase recalls the stored settings.

As noted above, when a command sequence is spoken, a print application is automatically opened, previously stored settings are recalled as a shortcut, and a print job is sent to the printer. By way of further example, a verbal "Ebridge Print" followed by "Photo" combines the invocation of the eBRIDGE app with a shortcut used to recall the settings associated with the "Photo" shortcut e.g., high resolution, full color, fit to page settings.

Figure 1:
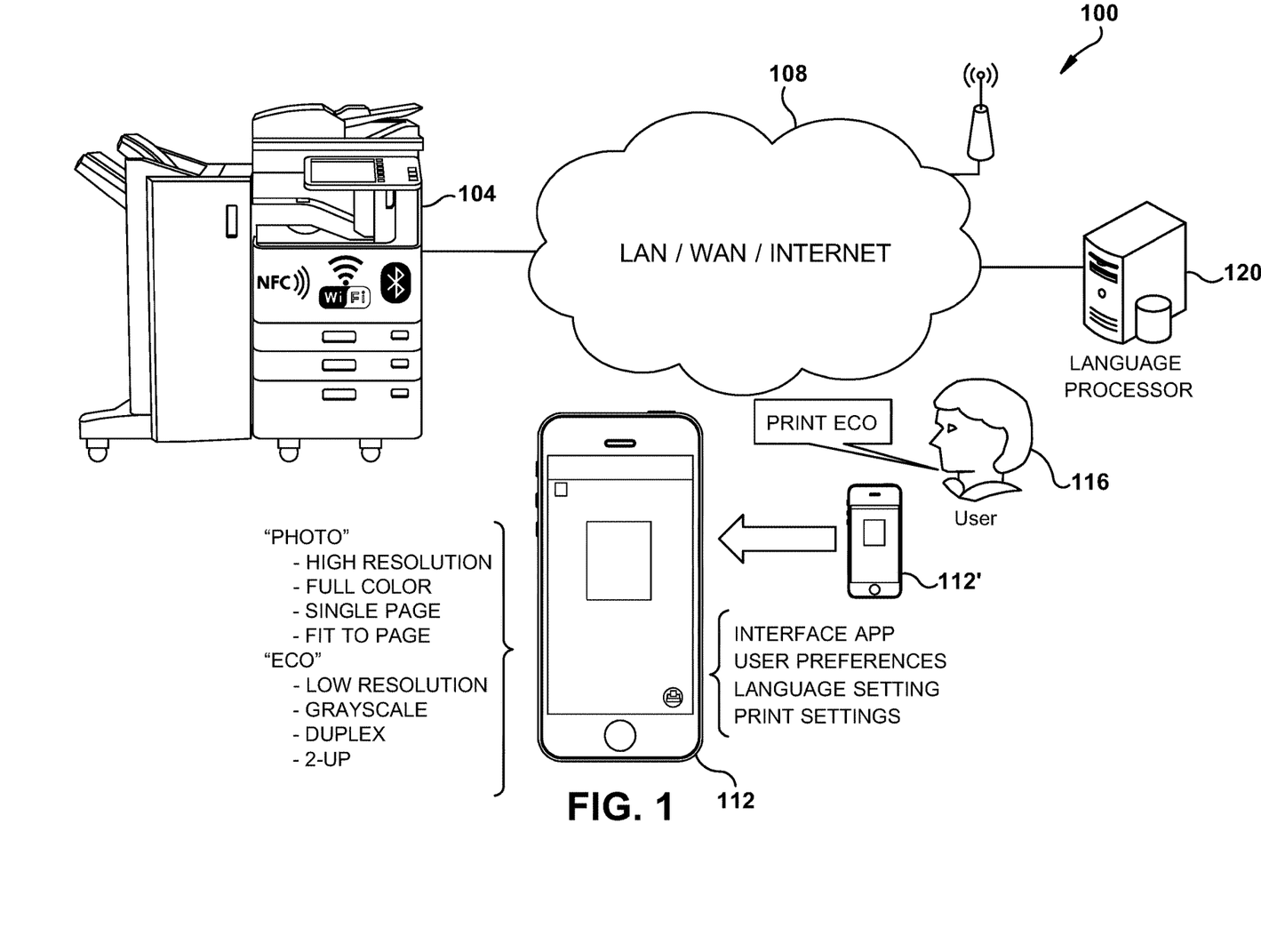
FIG. 1 is an example embodiment of a natural language document processing operation system.

FIG. 1 illustrates an example embodiment of a natural language operated document processing system 100 including one or more MFPs, such as MFP 104. MFP 104 is suitably connected to network 108 by any suitable wired or wireless data path. Network 108 is suitably comprised of a local area network (LAN), wide area network (WAN), which may comprise the Internet, or any suitable combination thereof. MFP is suitably provided with an ability for wireless communication with portable data devices such as smartphone 112/112'. Communication is suitably via Wi-Fi, including Wi-Fi direct, via near field communication (NFC), Bluetooth, or the like.

User 116 in possession of smartphone 112 approaches MFP 104. Smartphone 112 is running an interface app, and receives and stores the user's document processing preferences and preferred language. Natural language input is suitably converted to text via a processor on MFP 104, a processor on smartphone 112, or a combination thereof. Processing and text-to-speech conversion is also suitably performed by a networked language processor 120, suitably operable to receive a digital voice file and return a corresponding text file, thus eliminating dedicated hardware or software to provide such conversion. Document processing operations are then completed by a natural language dialog as will be detailed further below.

Figure 2:
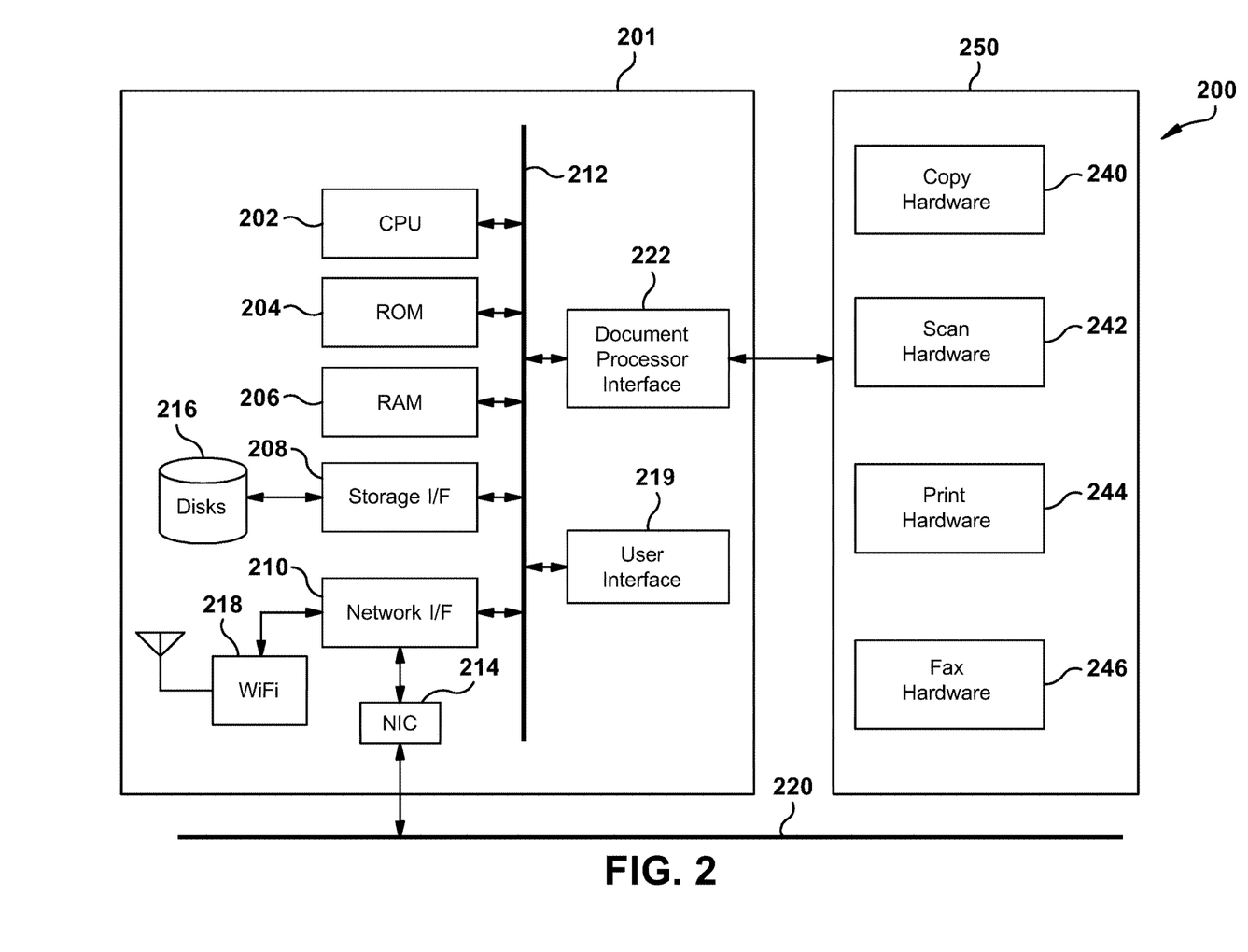
FIG. 2 is an example embodiment of a document processing device.

Turning now to FIG. 2 illustrated is an example embodiment of a MFP device comprised of a document rendering system 200 suitably comprised within an MFP, such as with MFP 104 of FIG. 1. Included in intelligent controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with one or more sensors which provide data relative to a state of the device or associated surroundings, such as device temperature, ambient temperature, humidity, device movement and the like.

Processor 202 can also be in data communication with any suitable user input/output (I/O) interface 219 which provides data communication with user peripherals, such as displays, keyboards, mice, track balls, touch screens, or the like. Hardware monitors suitably provides device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Intelligent controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
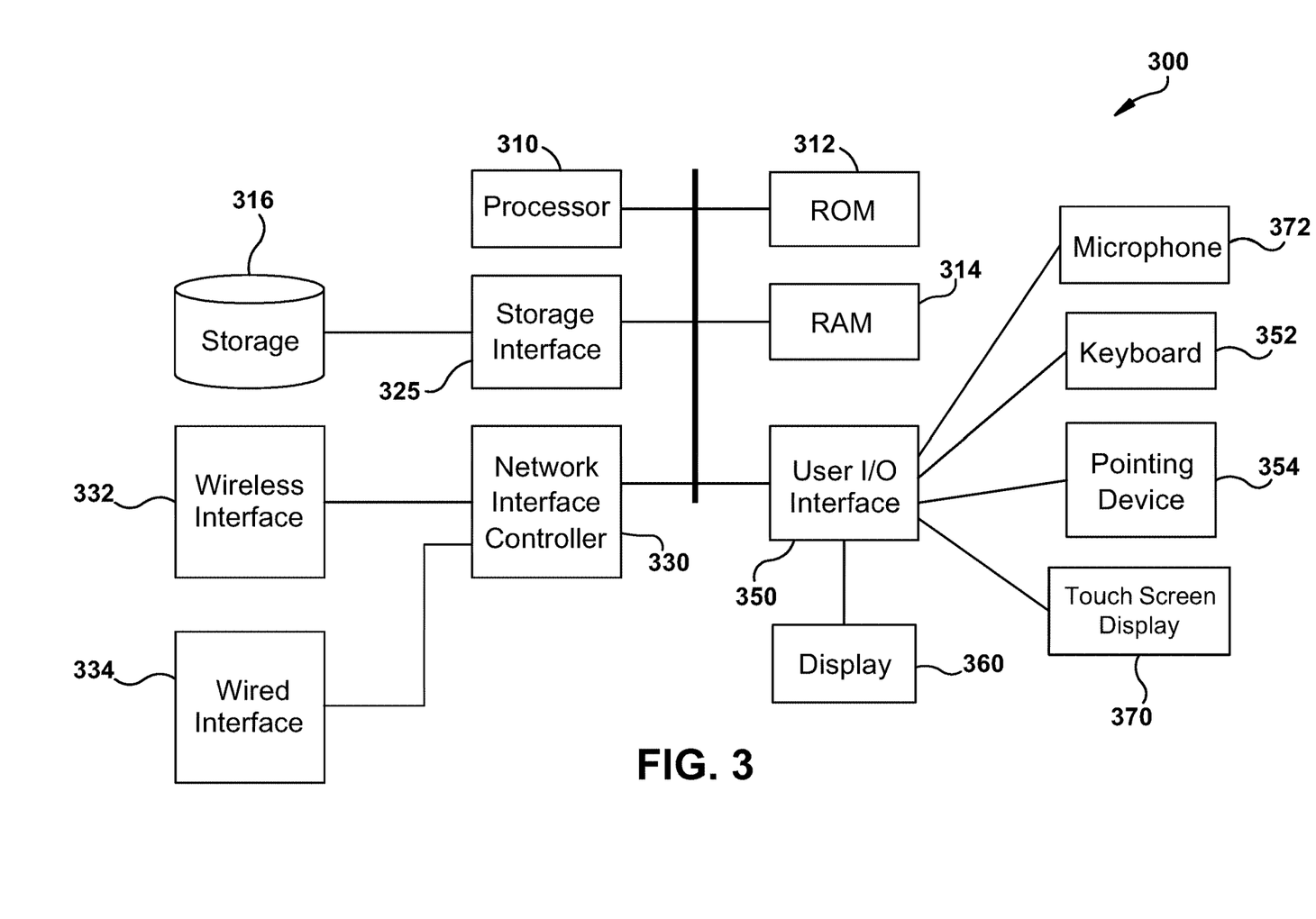
FIG. 3 is an example embodiment of a portable digital device.

Turning now to FIG. 3, illustrated is an example embodiment of a suitable portable digital device 300 such a smartphone 112 of FIG. 1. Included are one or more processors, such as that illustrated by processor 310. Each processor is suitably associated with non-volatile memory, such as read only memory (ROM) 312 and random access memory (RAM) 314, via a data bus 318.

Processor 310 is also in data communication with a storage interface 325 for reading or writing to a data storage system 316, suitably comprised of a hard disk, optical disk, solid-state disk, or any other suitable data storage as will be appreciated by one of ordinary skill in the art.

Processor 310 is also in data communication with a network interface controller (NIC) 330, which provides a data path to any suitable wired or physical network connection via physical network interface 334, or to any suitable wireless data connection via wireless interface 332, such as one or more of the networks detailed above. The system suitably uses location based services. In some embodiments, location based services can be used to facilitate management by one or more event management systems. By way of example, if multiple error event management systems are used, it may be advantageous to have monitoring of devices completed by a local or more proximate event management system.

Processor 310 is also in data communication with a user input/output (I/O) interface 350 which provides data communication with user peripherals, such as display 360, as well as keyboards 352, mice, track balls, or other pointing devices 354, touch screen 370, microphone 372 for digitized sound capture, or the like. It will be understood that functional units are suitably comprised of intelligent units, including any suitable hardware or software platform.

Figure 4:
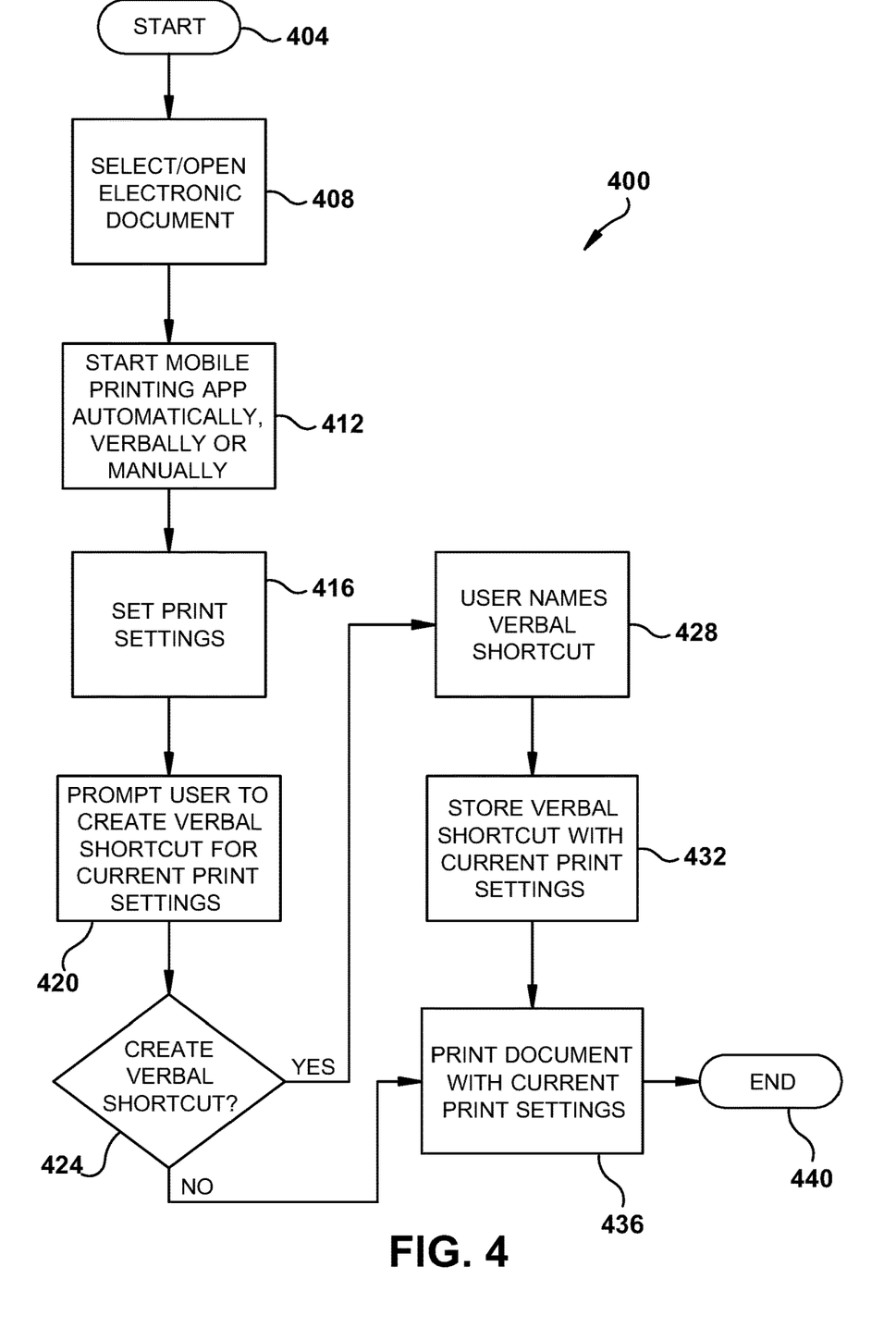
FIG. 4 is a flowchart of an example embodiment of voice assisted document processing operations.

FIG. 4 is a flowchart 400 of an example embodiment of voice assisted document processing operations wherein a user sets print settings for a print job and selectively links those settings to a chosen shortcut word that can be used later on to print using those same settings. The process commences at block 404 and proceeds to block 408 where a user selects or opens an electronic document for which printing is desired, suitably from their mobile device user interface. Any printable electronic document may be selected, including text files, image files, raster files, page description files, or the like. Once an electronic document has been selected or opened, the process proceeds to block 412 where a mobile printing app is launched. The printing app is suitably launched automatically once the electronic document has been selected, but is also suitably started by user interface interaction, such as via a device touchscreen or suitable verbal command.

Next, the user sets their desired print settings at block 416, and the user is prompted at block 420 as to whether they wish to associate those settings with a verbal shortcut for verbal invocation at a later time. If the user decides to create a shortcut at block 424, then the process proceeds to block 428 where the user supplies a verbal shortcut, suitably by speaking into a microphone to capture a digitized version of their speech. Alternatively, the user may wish to type the word they wish to use which can then be converted to a digital speech file by any suitable text-to-speech interface. This may be advantageous in situations such as when a user wishes to make their shortcut available to other users. A standardized voice rendering may be more universally compatible to different speaking voices as opposed to pure matching of a particular user's voice patterns, which may include variations in pronunciation or comprise different accents. In either instance, the print settings are stored associatively with the current print settings in block 432. The document is then printed at block 436 with the desired settings and the process ends at block 440. In the event the user chooses not to create a verbal shortcut at block 424, the process proceeds directly to block 436 for printing of the document before ending at block 440.

Figure 5:
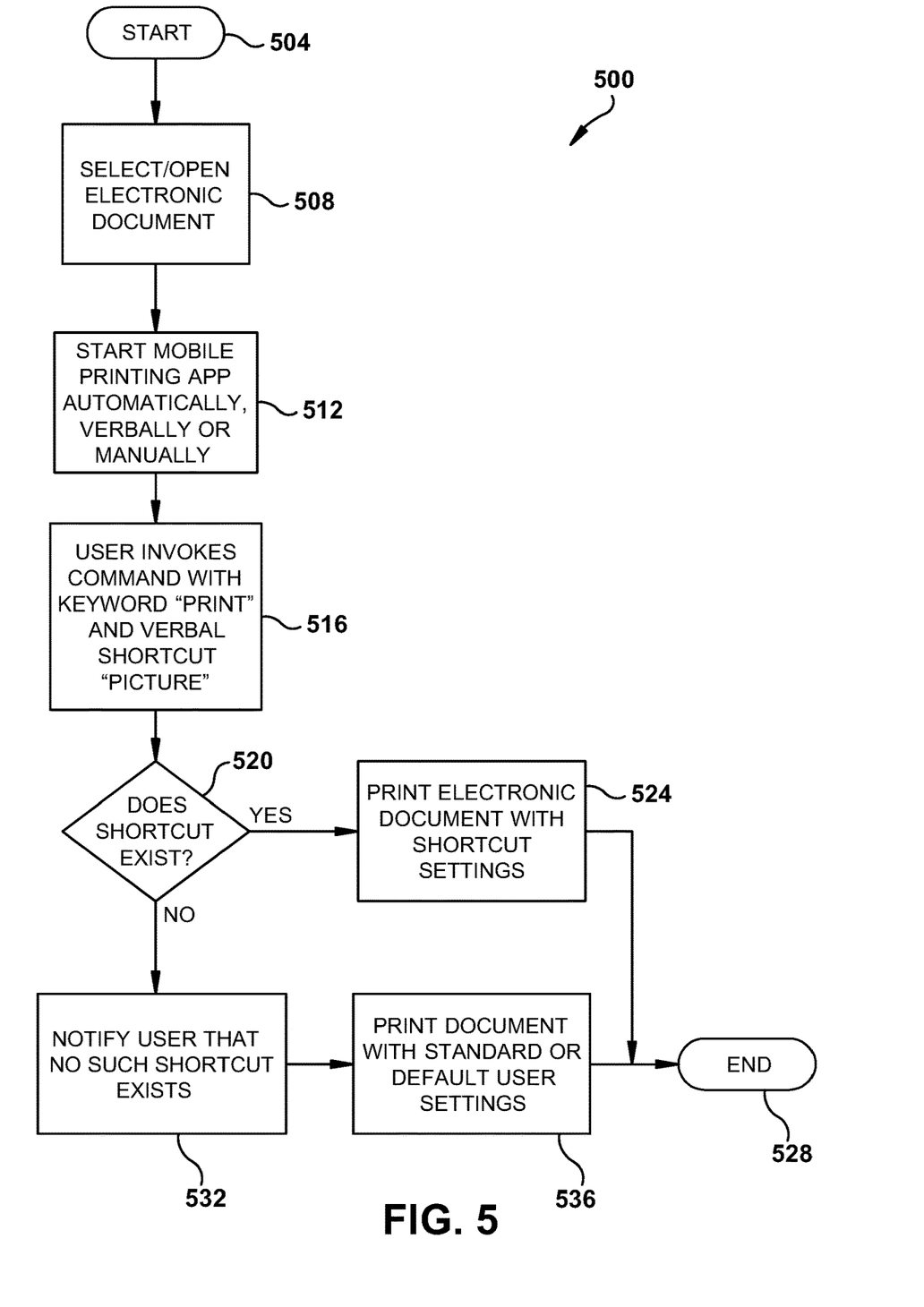
FIG. 5 is a flowchart of an example embodiment of a system for printing electronic documents using previously created verbal shortcuts associated with printer settings.

FIG. 5 is a flowchart 500 of an example embodiment of a system for printing electronic documents using previously created verbal shortcuts associated with printer settings. The process commences at block 504 and proceeds to block 508 where a user selects or opens an electronic document for which printing is desired, suitably from their mobile device user interface. As with FIG. 4, above, any printable electronic document may be selected, including text files, image files, raster files, page description files, or the like. Once an electronic document has been selected or opened, the process proceeds to block 512 where a mobile printing app is launched. The printing app is suitably launched automatically once the electronic document has been selected, but is also suitably started by user interface interaction, such as via a device touchscreen or suitable verbal command.

Next, progress is made to block 516 wherein the user verbally commences printing with preset printer settings previously associated with a verbal shortcut. This is suitably accomplished with a verbal sequence, such as "print," followed by the shortcut word associated with previously stored settings, such as "picture". The initial word "print" suitably invokes a print command, such as an "Open In" using a shortcut found in the Apple Siri electronic assistant application. A second word in the verbal sequence suitably comprises the previously stored printer settings shortcut word, such as "picture" to select settings previously associated with that verbal shortcut. A test is made at block 520 to determine if a shortcut exits. If so, the associated print settings are recalled, and the selected document is printed using those settings at block 524, and the process ends at block 528. If no such shortcut exists, the user is notified that no such shortcut exits at block 532, and the document is suitably printed with standard printer settings or default settings for the associated user at block 536 before the process ends at block 528.

Figure 6:
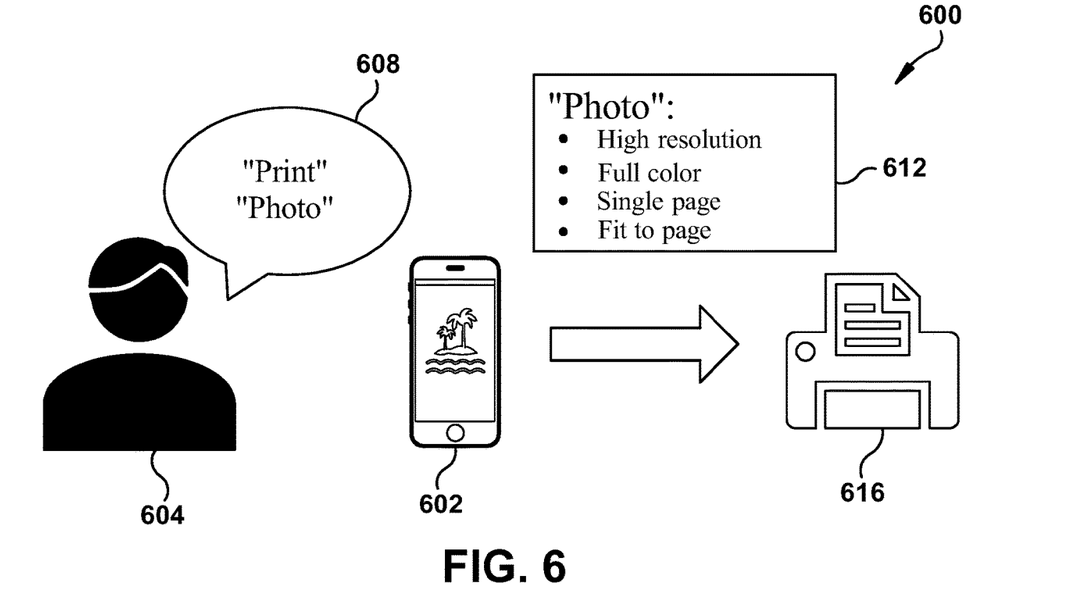
FIG. 6 is a first example embodiment of a verbal print operation.

FIG. 6 is a first example embodiment 600 of a verbal print operation. User 604 speaks instruction sequence 608 into their phone 602, which instruction sequence comprises the word "print" followed by the word "photo". As noted by block 612, the word "photo" has been previously associated with high resolution, full color, single page and fit to page printer settings. After the sequence is spoken, the user's selected document forms printout 616.

Figure 7:
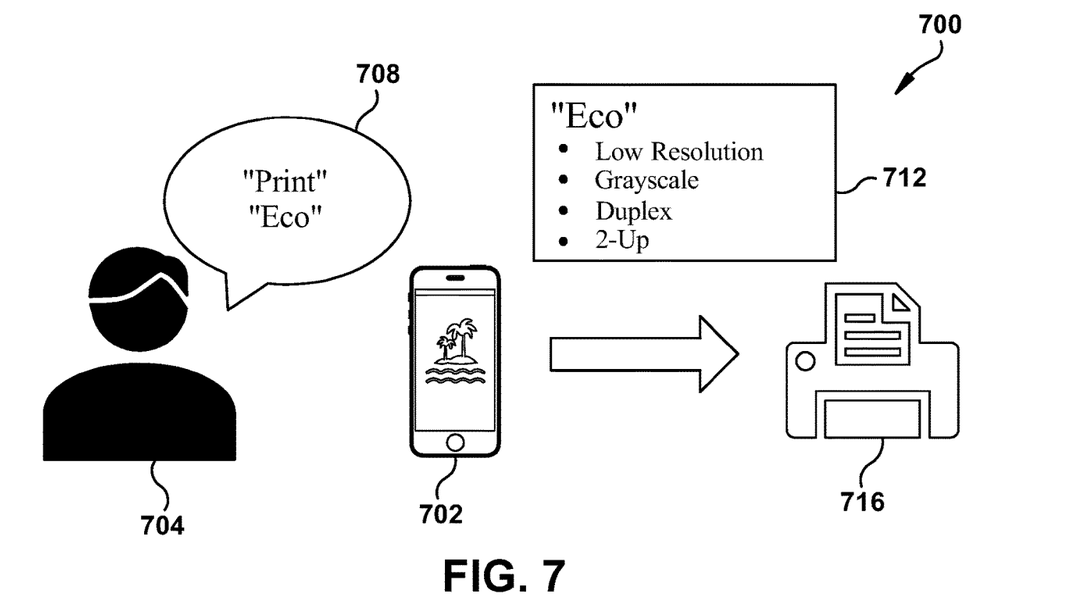
FIG. 7 is a second example embodiment of a verbal print operation.

FIG. 7 is a second example embodiment 700 of a verbal print operation. User 704 speaks instruction sequence 708 into their phone 702, which instruction sequence comprises the word "print" followed by the word "eco." As noted by block 712, the word "eco" has been previously associated with low resolution, grayscale, duplex and 2-up printer settings. After the sequence is spoken, the user's selected document forms printout 716.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A portable data device comprising:
a memory storing a printer application;
a wireless data interface;
a user interface including a touchscreen display and a microphone;
a processor configured to receive a user selection of an electronic document via the user interface,
the processor further configured to receive digitized verbal commands from a user via the microphone,
the processor further configured to receive user selected print settings in accordance with user input to the printer application via the user interface for printing of the selected electronic document,
the processor further configured to print the selected electronic document in accordance with the user selected print settings,
the processor further configured to receive a user instruction from an associated user via the user interface to associate the user selected print settings with a user selected verbal instruction,
the processor further configured to receive the user selected verbal instruction via the user interface,
the processor further configured to receive a user assigned shortcut name,
the processor further configured to store the user selected print settings in the memory associatively with the user selected verbal instruction and shortcut name as a shortcut command;
wherein the microphone is configured to receive a verbal print command sequence from the user wherein one wherein one verbal command of the sequence is comprised of a print command and a second command of the sequence is comprised of the shortcut command,
wherein the processor is further configured to automatically open the printer application upon receipt of a verbal print command, and
wherein the processor is further configured to commence printing of the electronic document using selected print settings associated with the shortcut command after receipt of the verbal command sequence.

2. The portable data device of claim 1 wherein
the processor is further configured to receive a user selection of a second electronic document via the user interface, and
the processor is further configured to print the second electronic document in accordance with the stored user selected print settings when the user selected verbal instruction corresponds to the shortcut command associated with a shortcut name.

3. The portable data device of claim 1 wherein
the memory is further configured to store a plurality of shortcut commands, each shortcut command including a unique verbal instruction associated with a unique printer settings and a unique shortcut name.

4. A method comprising:
receiving a user selection of an electronic document via a user interface of a portable data device;
receiving user selected print settings into a printer application via the user interface for printing of the selected electronic document;
printing the selected electronic document in accordance with the user selected print settings;
receiving a user instruction via the user interface to associate the user selected print settings with a user selected verbal instruction;
receiving the user selected verbal instruction via the user interface;
receiving a user assigned shortcut name;
storing the user selected print settings in a memory associatively with the user selected verbal instruction and shortcut name as a shortcut command;
receiving a verbal command sequence from the user via digitized speech from a microphone the user wherein one wherein one verbal command of the sequence is comprised of a print command and a second command of the sequence is comprised of the shortcut command;
automatically opening the printer application upon receipt of a verbal print command, and
commencing printing of the electronic document using selected print settings associated with the shortcut command after receipt of the verbal command sequence.

5. The method of claim 4 further comprising:
receiving a user selection of a second electronic document via the user interface; and
printing the second electronic document in accordance with the stored user selected print settings when the user selected verbal instruction corresponds to the shortcut command associated with a shortcut name.

6. The method of claim 4 further comprising:
storing a plurality of shortcut commands, each shortcut command including a unique verbal instruction associated with a unique printer settings and shortcut name.

7. A portable data device comprising:
a memory storing a printer application;
a processor;
a wireless data interface; and
a user interface, including a touchscreen and a microphone, configured to receive an electronic document selection from an associated user,
wherein the microphone is configured to receive a verbal print command from the user,
wherein the processor is configured to automatically open the printer application upon receipt of the verbal print command,
wherein the processor is further configured to receive user selected print settings in accordance with user input to the printer application via the user interface,
wherein the processor is further configured to commence printing of the user selected electronic document in accordance with received user selected print settings,
wherein the processor is further configured to receive a user instruction via the user interface to associate the user selected print settings with a verbal shortcut,
wherein the processor is further configured to receive a digitized verbal command from the user via the microphone,
wherein the processor is further configured to store a received verbal command in the memory associatively with the user selected print settings as a shortcut command,
wherein the user interface is further configured to receive a second electronic document selection from an associated user,
wherein the microphone is further configured to receive a verbal command sequence via the microphone, wherein one verbal command of the sequence is comprised of a print command and a second command of the sequence is comprised of the shortcut command, and
wherein the processor is further configured to commence printing of the second electronic document in accordance with the user selected print settings associated with the shortcut command after receipt of the verbal command sequence.

8. The portable data device of claim 7 wherein the processor is further configured to generate a user prompt corresponding to selective creation of the shortcut command, and wherein the user instruction to associate the user selected print settings to the verbal shortcut is received responsive to the user prompt.

9. The portable data device of claim 8 wherein the memory is further configured to store a plurality of shortcut commands, each shortcut command including a unique verbal command associated with a unique printer settings.

10. The portable data device of claim 9 wherein
the processor is further configured to receive a third electronic document selection from the associated user,
wherein the microphone is further configured to receive a second verbal command sequence via the microphone, wherein one verbal command of the sequence is comprised of a print command and a second command of the sequence is comprised of a second shortcut command, and
wherein the processor is further configured to commence a print of the third electronic document in accordance with stored print settings corresponding to the second shortcut command.

11. The portable data device of claim 10 wherein the stored print settings include one or more of print resolution, paper size, color mode, grayscale mode, black-and-white mode, number of copies, duplex mode or N-up mode.

12. The portable data device of claim 7 wherein the processor is further configured to generate a user confirmation prompt from the user interface for confirmation of a stored received verbal command and wherein the shortcut command is selectively stored responsive to a user response to the user confirmation prompt.

* * * * *